Patented June 30, 1942

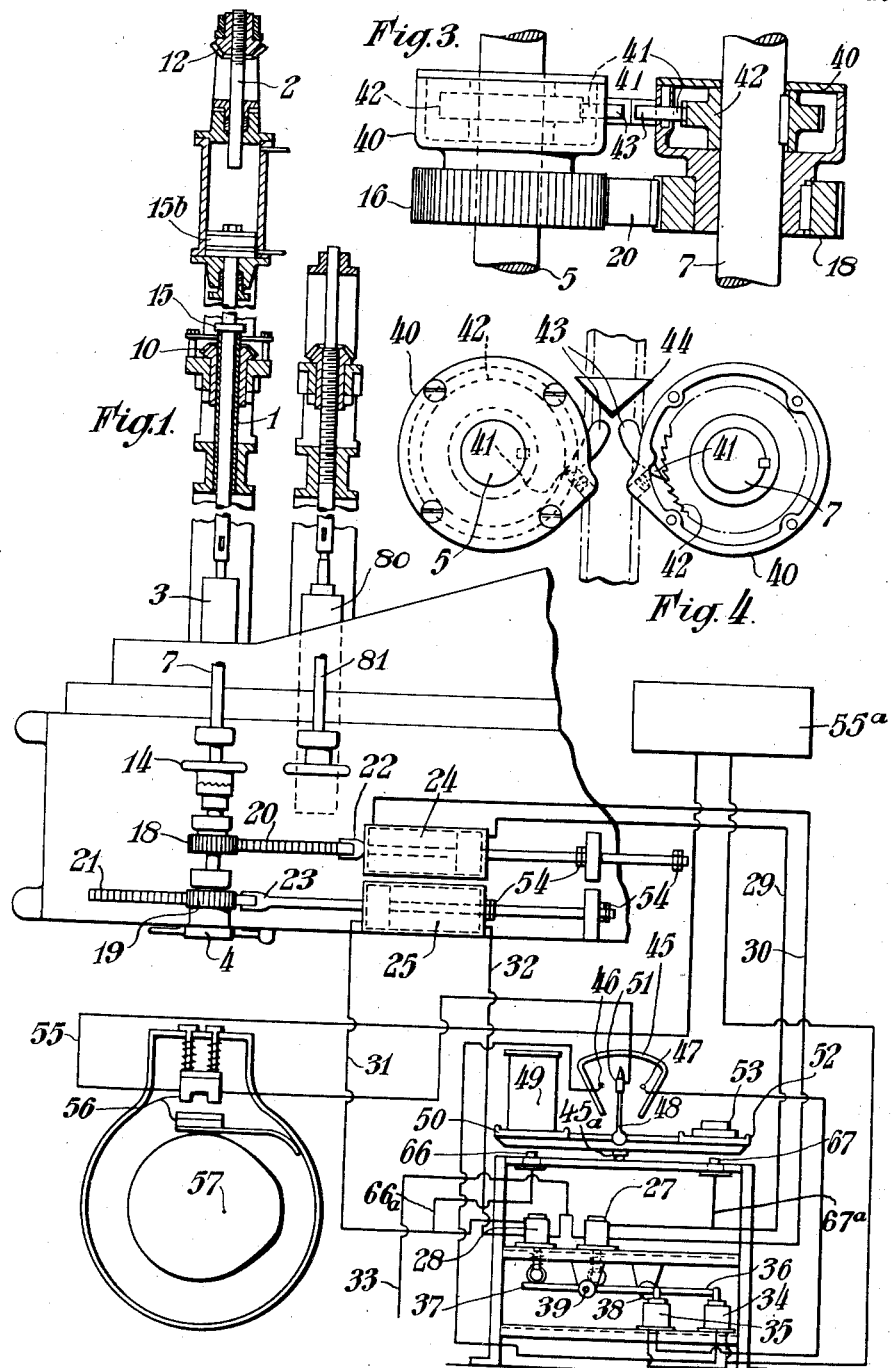
June 30, 1942.  J. T. WOOD  2,288,381
GLASS FEEDING DEVICE
Filed Aug. 20, 1938  2 Sheets-Sheet 1

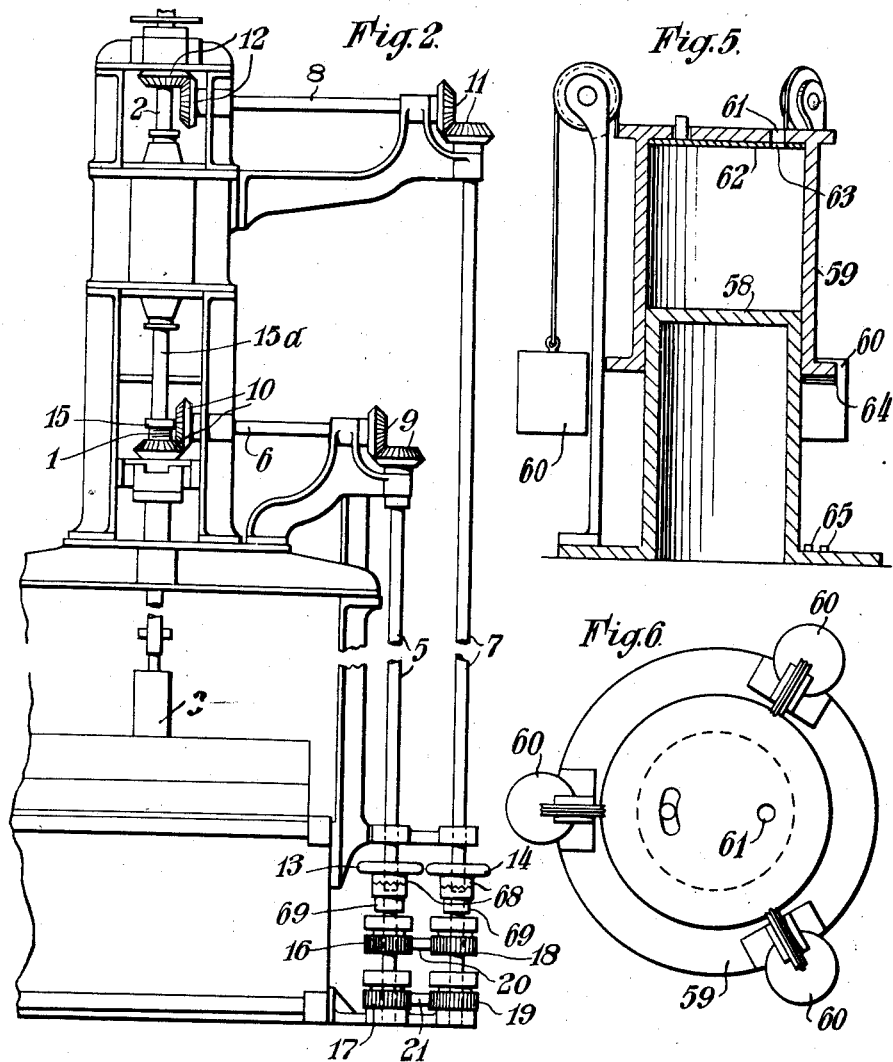

2,288,381

UNITED STATES PATENT OFFICE 2,288,381

GLASS FEEDING DEVICE

John Thomas Wood, Bootle, Liverpool, England

Application August 20, 1938, Serial No. 226,001
In Great Britain August 21, 1937

6 Claims. (Cl. 49—55)

This invention relates to glass feeding devices of the type wherein the flow of glass from a forehearth, channel, conduit or the like is controlled by a gob control device or devices.

Feeders of the above type are associated with forming machines for the manufacture of bottles or other containers or articles (hereinafter referred to as containers) and in practice it is found necessary to check the weight of the containers frequently. This is due to the temperature, depth of glass in the forehearth or furnace and/or other furnace conditions varying from time to time and such conditions cause the weight of the glass being fed to vary automatically, i. e. the viscosity of the glass is changed.

It is of the greatest importance that the weight of the gob of glass being fed should remain constant so that the containers being formed are of uniform weight and it will readily be understood that should the weight of the gob be above the desired weight the machine operator has to correct this by manipulating the stroke of movement of the gob control device. This adjustment of the gob control device is usually obtained by hand operated means and this entails a considerable time over the working period of the machine due to the number of times it is found necessary to adjust the plunger's stroke. It will be understood that should the weight of the gob be greater than the desired weight the operator has to adjust the gob control device so that a smaller quantity of glass is delivered from the outlet from the forehearth. When the weight of the gob is below the desired weight then the operator has to adjust the gob control device so as to deliver a large quantity of glass from the outlet.

The term gob control device or devices is to be construed as including any device which by itself or in combination with other means controls the shape and/or weight of the gob of glass which is delivered from the forehearth.

Referring to the accompanying drawings in which several embodiments are shown by way of example only:

Fig. 1 is a part sectional and diagrammatic view of a glass feeder fitted with the improved control means;

Fig. 2 is a front elevation of part of the glass feeder and control means;

Figs. 3 and 4 are respectively a part sectional side elevation and a plan of the free wheel devices for the control means on the feeder;

Figs. 5 and 6 are respectively a sectional elevation and a plan of a dash-pot for the weighing means; and Fig. 7 is a diagrammatic view of a device for limiting the movement of the control means.

The embodiment of this invention for a glass feeder of the type shown includes a pair of stops 1, 2 adapted to control the stroke of the plunger 3 relative to the feed outlet 4 and shafts 5, 6, and 7, 8 with pairs of bevel gears 9, 10, and 11, 12 and hand wheels 13, 14 for controlling the vertical movement of the stops 1, 2. The stop 1 is adjustable relative to the fixed collar 15 on the piston rod 15ᵃ and the stop 2 is adjustable relative to the piston 15ᵇ. The pinions 16, 17, 18 and 19 (associated with the hereinafter described free wheel devices) are arranged in pairs on the shafts 5, 7 so that a double sided rack 20 or 21 may be arranged between the pinions of each pair to rotate the shafts in one direction only and each rack is attached to the piston rod 22 or 23 of a compressed air or other fluid pressure piston cylinder 24 or 25. Compressed air or other fluid is admitted to the cylinders through the medium of the double acting valves 27, 28 and inlet and return tubes 29, 30 and 31, 32. The valves are connected to an air compressor or other fluid supply means by means of the main feed pipe 33. Each double acting valve is spring returned and actuated by a solenoid 34 or 35 and such solenoid is connected to an electrical circuit having contacts associated with weighing means. The valves are operated by the solenoids 34, 35 through levers 36, 37 and pivots 38, 39 to adapt the valve stroke to that of the solenoids.

The aforesaid free wheel devices may each comprise a casing 40 keyed to one of the aforesaid pinions 16 to 19 and carrying a pivoted pawl 41 to engage an internal ratchet wheel 42 secured to one of the hand wheel shafts 5, 7. Each of the pawls 41 has an outwardly projecting tail 43 which engages a trip member 44 at the end of the free wheel stroke of the rack 20 or 21 so that the respective pawls are temporarily disengaged for ensuring that the driving stroke of the other rack could take place at the instant one rack ceases its free wheel stroke.

The weighing means 45 may be of the usual pan and weight type, mounted on knife edge 45ᵃ as shown, the contacts 46, 47 are arranged on each side of the scale beam pointer 48. The arrangement is such that when a container 49 is placed upon its scale pan 50, if it is of correct weight no operation of the electric circuit will take place. Should the container be too heavy the scale pan 50 will descend and engage the contact 51 on the pointer with the contact 46 for completing the electrical circuit connected therewith and in this manner the double acting valve 27 will be operated by its solenoid 34 for admitting compressed air or other fluid pressure to the cylinder 24 so that the rack 20 will be operated for rotating the pinions 16, 18 on the vertical shafts 5, 7. The stops 1 and 2 will thus be lowered equal distances so that the working position of the plunger's stroke and not its length will be altered i. e., lowered bodily to cause the lower end of the plunger 3 to approach more nearly to the feed outlet 4 on the downward stroke of the plunger. Should the containers 49 be too light then the opposite action will take place, the contact 51 will be engaged with the contact 47 on the side of the scale pan 52 for the weights 53 and the double acting valve 28 will be actuated by its solenoid 35 for admitting compressed air to its associated cylinder 25. The other rack 21 will thus operate its associated pinions 17, 19 and cause the stops 1 and 2 to be raised equally to such a position that the plunger 3 will be raised bodily in its stroke away from the outlet 4 for delivering a larger weight of glass. The stroke of each rack 20, 21 is adjustable by the lock nuts 54 to allow the change in weight to be adjusted, and the contacts 46, 47 may also be adjustable.

To prevent the double acting valves 27, 28 being wrongly actuated, i. e., by vibratory or accidental movement of the scales, the main electrical circuit 55, leading from electric current source 55a, is broken by a main switch. Fig. 1 shows a switch device 56 operated by a cam 57 on the usual timing machine associated with a glass feeder, so that the switch is closed at predetermined intervals to coincide with the placing of a container on the scale by a take-out device of any known type.

When the containers 49 are to be placed on the weighing means by hand, the automatically closed main switch is not suitable in that should an operator fail to place a container on the weighing means at the proper time, the apparatus may be operated automatically for a container underweight. To prevent this, for hand deposited containers it is preferred to operate the main switch through a delayed action device, as shown in Figs. 5 and 6. For example, an air controlled dash-pot is used (oil or other fluid dash-pots may be used) comprising an inner cylinder 58 mounted on the scale pan 50 and an outer cylinder 59 enclosing the inner cylinder with a neat sliding fit. The arrangement is such, that the outer cylinder 59 is held in a raised normal position by counter-balance weights 60, and a container 49 is placed on such cylinder. Immediately weight is placed on the outer cylinder it will descend at a speed determined by the speed at which the air between the two cylinders 58, 59 is exhausted through an outlet 61 which is furnished with a control shutter 62 apertured at 63. The delay caused by the settling of the outer cylinder 59 allows the weighing means to assume a correct weighing position before the outer cylinder closes the main switch which may comprise a strip 64 on the cylinder for connecting the two contacts 65 which are inserted in the main circuit 55.

To retain the weighing means at a given reading during each weighing operation, a stop may be moved automatically into engagement with one or the other of the scale pans 50, 52. For example, the aforesaid double acting valves 27, 28 are arranged to supply air to spring returned plungers 66, 67 beneath the scale pans. In this manner, should a heavy container be weighed the stop plunger 67 beneath the weight scale pan 52 would be raised to prevent the pan's descent during the weighing operation, which would break the electrical circuit prematurely at the contact 46. For a light container the plunger 66 works in a similar manner beneath the pan 50. When the scales are at rest the stop plungers are clear of the scale pans. The stops are of any known form, i. e., each plunger 66 or 67 is mounted in a cylinder into which air is admitted from the pipe line 66a connected to the tube 31 in the one case and pipe line 67a connected to the tube 29 in the other case. Air also exhausts through pipe lines 66a and 67a back through the valves 27 and 28 to atmosphere and the plungers return to a normal position under the action of return springs, although their own weight could be utilized.

Also to enable the pinions 16 to 19 to be disconnected from driving engagement with the shafts 5, 7, the shafts are divided and connected by clutch members 68 on the hand wheels 13, 14 and clutch members 69 on the lower portion of the shafts.

In the modification shown in Fig. 7, the apparatus may be arranged to change the weight of glass being delivered by an amount approximately equal to the difference from the correct weight. For example, the aforesaid racks 20, 21 are adjusted for a stroke equivalent to a change in the weight of ½ oz. and a stop 70, 71 arranged to interrupt each stroke to limit it to ¼ oz. The stop 70 or 71 is operated by a solenoid 72 or 73. Electrical circuits for the solenoids are provided with contacts 74, 75 situated adjacent and wired to the beforenamed contacts 46, 47 on the weighing means 45. For example, for a heavy container the stop 70 would be moved into position to limit the rack 20 when the contact 74 was engaged and when the scale moves on to ½ oz. overweight the stop would be withdrawn. For containers underweight the arrangement could be the same for pan scales of the type shown.

The automatic control means may be varied to suit the type of gob control device and hand adjusting means to which it has to be applied without departing from the scope of the invention.

What I claim is:

1. In a glass feeding device including variable gob control means, apparatus for adjusting the working movement of the gob control means in response to variations in weight of the articles formed from gobs delivered by the feeding device comprising pneumatic power actuated means for varying the working movement of the gob control means, a pneumatic power supply circuit for energizing said power actuated means, valves in said power supply circuit, means for weighing the article, means actuated by the weighing means in response to variations in the weight of said articles from a predetermined standard weight to control operation of said valves, an energy control device in said valve control means, and means for actuating said energy control device in predetermined time relation to the operation of said weighing means.

2. In a glass feeding device including variable gob control means, apparatus for adjusting the working movement of the gob control means in response to variations in weight of the articles formed from gobs delivered by the feeding device comprising pneumatic power actuated means for varying the working movement of the gob control means, a pneumatic power supply circuit for energizing said power actuated means, valves in said power supply circuit, means for weighing the article, an electric power circuit actuated by the weighing means in response to variations in the weight of said articles from a predetermined standard weight to control operation of said valves, a switch in said electric power circuit, and means for actuating said switch in predetermined time relation to the operation of said weighing means.

3. In a glass feeding device including variable gob control means, apparatus for adjusting the working movement of the gob control means in response to variations in weight of the articles formed from gobs delivered by the feeding device comprising pneumatic power actuated means for varying the working movement of the gob control means, a pneumatic power supply circuit for energizing said power actuated means, valves in said power supply circuit, means for weighing the article, an electric power circuit actuated by the weighing means in response to variations in the weight of said articles from a predetermined standard weight to control operation of said valves, a switch in said electric power circuit, and means for periodically actuating said switch in predetermined time relation to the operation of said weighing means.

4. In a glass feeding device including variable gob control means, apparatus for adjusting the working movement of the gob control means in response to variations in weight of the articles formed from gobs delivered by the feeding device comprising pneumatic power actuated means for varying the working movement of the gob control means, a pneumatic power supply circuit for energizing said power actuated means, valves in said power supply circuit, means for weighing the article, an electric power circuit actuated by the weighing means in response to variations in the weight of said articles from a predetermined standard weight to control operation of said valves, a switch in said electric power circuit, and a time delay device for actuating said switch in predetermined time relation to the operation of said weighing means.

5. In a glass feeding device including variable gob control means, apparatus for adjusting the working movement of the gob control means in response to variations in weight of the articles formed from gobs delivered by the feeding device comprising power actuated means for varying the working movement of the gob control means, a power circuit for energizing said power actuated means, weighing means adapted to receive articles formed from the gob, energy control devices in said power circuit actuated by the weighing means in response to variations in the weight of said articles from a predetermined standard weight to energize said power actuated means, a further energy control device in said power circuit, means for actuating said further energy control device in predetermined time relation to the operation of said weighing means, and means actuated by the operation of said energy control devices for maintaining the weighing means in control-actuating position during the period required for completion of the control operation.

6. In a glass feeding device including variable gob control means, apparatus for adjusting the working movement of the gob control means in response to variations in weight of the articles formed from gobs delivered by the feeding device comprising pneumatic power actuated means for varying the working movement of the gob control means, a pneumatic power supply circuit for energizing said power actuated means, valves in said power supply circuit, means for weighing the article, an electric power circuit actuated by the weighing means in response to variations in the weight of said articles from a predetermined standard weight to control operation of said valves, a switch in said electric circuit, means for actuating said switch in predetermined time relation to the operation of said weighing means, and movable stop members adjacent said weighing means actuated by operation of said valves into contact with said weighing means to maintain the weighing means in control-actuating position during the period required for completion of the control operation.

JOHN THOMAS WOOD.